May 11, 1943.　　　　E. FESS　　　　2,318,605
APPARATUS FOR DEVELOPING PHOTOGRAPHIC FILMS
Filed July 6, 1939　　　2 Sheets-Sheet 1
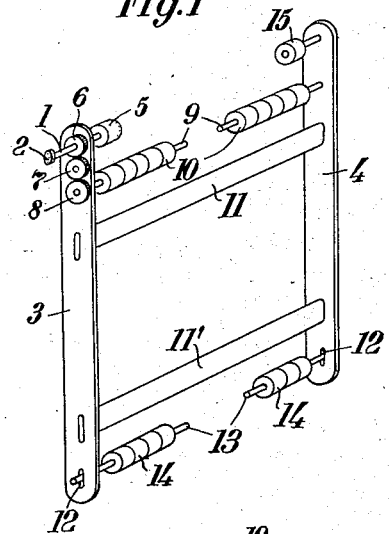
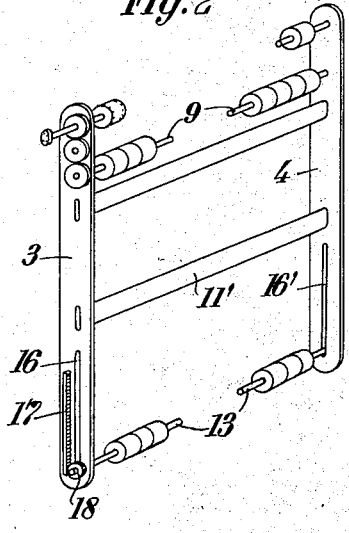
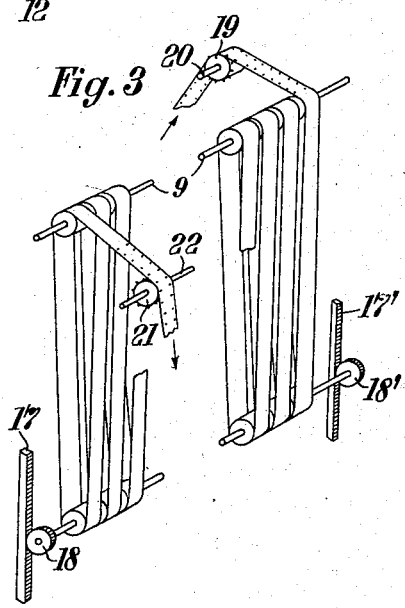
Inventor
Emil Fess
By His Attorneys

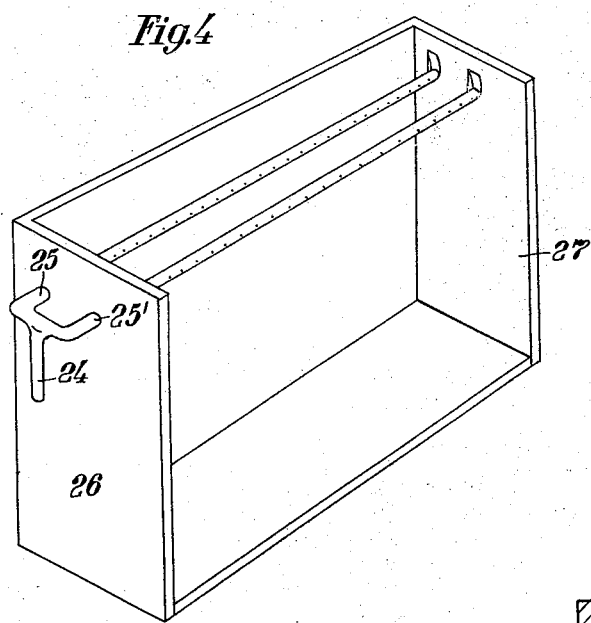
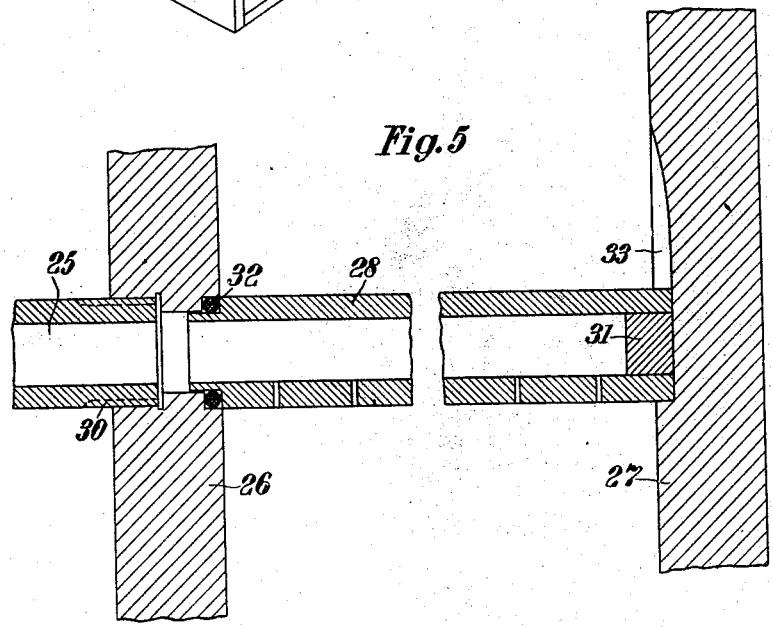

Patented May 11, 1943

2,318,605

UNITED STATES PATENT OFFICE 2,318,605

APPARATUS FOR DEVELOPING PHOTOGRAPHIC FILMS

Emil Fess, Dessau, Germany, assignor, by mesne assignments, to General Aniline & Film Corporation, New York, N. Y., a corporation of Delaware Application July 6, 1939, Serial No. 283,015
In Germany July 7, 1938

4 Claims. (Cl. 271—2.3)

My present invention relates to an apparatus for developing photographic films which comprises a container for liquid, roller frames and driving mechanism. The use of frames for supporting the axles of the rollers has the advantage that the apparatus can be loaded with the film by removing the frames and winding the film upon them in a simple manner as if they were fixed developing frames. The dimensions of the frames are preferably such that they can be removed from the container without the aid of any special expedient. The frame carries an axle for driving the rollers; this axle can be coupled with the driving mechanism in such a manner that the drive is automatically transmitted through the axle on insertion of the frame into the container and is uncoupled automatically on removal of the frame. Two different kinds of frames are provided for the developing apparatus; those in which the length of the loop of film is variable and those in which it is invariable. The two frames have the same breadth so that they can readily be exchanged for one another.

One object of my invention is to provide an apparatus for developing films in which the rollers carrying the loops of film are not fast on the driven shaft mounted in the frame, but are capable of slipping on the shaft when their peripheries are subject to sufficient friction.

A further object of the invention resides in the provision of rollers carrying the loops of film and having a diameter which is somewhat greater than that of the pitch circle of the toothed rollers which drive the film, so that the slip between the driven shaft and the rollers is compensated and the rollers continuously transport the film.

Other objects of my invention will be apparent more in detail hereinafter.

Reference is made to the accompanying drawings, in which

Figure 1 is a perspective view of a roller frame in which the length of loop is invariable;

Figures 2 and 3 are like views of roller frames in which the length of loop is variable;

Figure 4 is a like view of the container for the liquid with tubes carrying spraying nozzles, one of the sides of container having been removed, and Figure 5 is a section through an exchangeable spraying nozzle tube.

The frames are made for instance of artificial material and comprise sides 3 and 4 held together by strips 11 and 11' (Figure 1). At the upper end of the frame a shaft 1 is journalled in the side 3. The shaft is coupled by a pulley 2 with driving apparatus not shown in the drawings and carries between the sides 3 and 4 a toothed roller 5 for driving the film. A gear wheel 6 fixed on the shaft 1 drives a gear wheel 8 and therewith a shaft 9 through a pinion 7. Film guide rollers 10 are mounted on the shaft 9 so as to be capable of rotating therewith notwithstanding a small amount of friction at their peripheries. At the lower end of the frame, the sides have slotted bearings 12 for a shaft 13 on which are mounted guide rollers 14 in such a manner that they are turned by friction by the shaft 13; the latter can slide vertically for a short distance in the slotted bearings. At the upper end of the side 4 is a further guide roller 15.

The diameter of the guide rollers 10 is greater by a small percentage than that of the pitch circle of the toothed drum 5, so that the slip between the shaft 9 and the rollers 10 is compensated and the rollers advance the film continuously.

Instead of the frame shown in Figure 1 in which the length of film which can be treated on the frame cannot be varied, there may be used the frame shown in Figures 2 and 3, which allow the length of loop to be varied during use.

In Figures 2 and 3 the strip 11' is placed at a higher level in the frame than is the case in Figure 1 so as to allow extended slots 16, 16' in the sides 3 and 4. Racks 17, 17' are fixed beside these slots for engagement of pinions 18, 18' on the end of shaft 13 whereby the latter is compelled to move only parallel to the shaft 9. The upper part of the frame is constructed in the same way as that shown in Figure 1.

In order to alter the length of film on the frame shown in Figure 2 it is necessary that in a given time a greater or smaller length of film should pass on to the frame than passes off, according to whether an increase or a decrease in the length of film being wound up is required. In the apparatus known hitherto in which the rollers are fixed on the driven shaft or shafts, or in which the rollers are not driven at all but can rotate individually, there is produced at each variation in the length of the loop of film a tension which is not uniformly distributed in the individual lengths of film.

In the apparatus according to the invention, the drive of the driven roller shaft must vary in dependence on whether the length of film wound on the frame is increased or diminished.

Figure 3 shows a frame on which is a loop of film of varying length, the parts not necessary for understanding the figure having been omitted.

The film is fed by the toothed roller 19 fixed on the shaft 20, and is wound off by the toothed roller 21 fixed on the shaft 22. By the invention the roller shaft 9 is driven with the velocity of the faster moving toothed roller shaft 20 or 22. Thus when the length of film is being shortened, the shaft 22 runs more quickly than the shaft 20, and the shaft 9 turns at the same speed as the shaft 22. When the length of film is being increased, however, the shaft 9 is driven at the same speed as the shaft 20. The tension of the film in the individual loops is automatically equalized. If for any reason the tension in one loop is higher, the friction between the corresponding roller and the shaft is simultaneously increased, so that more film is fed by this roller and the tension in the loop is decreased. Since this equalization constantly occurs, all the loops are under the same tension, which is determined by the weight of the lower shaft 13 and rollers 14.

The method of winding described, in which the emulsion side of the film never comes into contact with the guide rollers makes it possible to provide in a simple manner devices for avoiding streaky development. It is known to spray the developer in air or under the surface of the liquid in order to supply the film uniformly with unused developer. Another known expedient is to pump the liquid continuously round the container in order thoroughly to mix the contents. The quantity of liquid which can be sprayed is limited firstly because the individual sprays, in order to avoid damaging the emulsion or too rapid development, must not be too strong, secondly it is inadvisable to increase the number of sprays and reduce the size of the nozzles to too great an extent as otherwise the nozzles easily become blocked.

Both these difficulties are avoided by the invention by providing the nozzles in the form of tubes which can turn on their axes and which can readily be removed from the container for cleaning, without the necessity of emptying the container.

Referring to Figures 4 and 5 the pipe 24 for supplying developer is connected by one or more pipes 25, 25' to a wall 26 of the container 27. For the sake of clarity the front wall has been omitted from Figure 4. The pipe 25 is fixed in the wall 26 for instance by a screw thread 30. The nozzle tube 28 is stopped at one end by a plug 31 while the other end has a recess in which packing 32 is inserted. The wall 27 has a recess 33 the bottom of which provides a stop for the nozzle tube 28. The latter can thus be readily removed and replaced but remains firmly in the position shown in Figures 4 and 5, because the packing 32 presses the tube against the wall 27. The tube can be rotated on its axis, so that nozzles can be brought into the most advantageous orientation for spraying.

I claim:

1. In an apparatus for developing photographic films, a driving mechanism having a frame, a driven shaft carried by said frame, a toothed roller for driving said film and connected with said driven shaft for rotation at the same angular velocity as that of said shaft, an idler shaft also carried by said frame and spaced from said driven shaft, said frame having slots in which said idler shaft is movable towards and away from said driven shaft, pinions fastened to the ends of said idler shaft and racks mounted on said frame adjacent said slots, said racks being engaged by said pinions and maintaining said idler shaft parallel to said driven shaft regardless of movement of said idler shaft towards and away from said driven shaft, each of said shafts carrying rollers for guiding the film around said shafts, the guide rollers on said driven shaft being mounted thereon for rotation therewith until there is a certain amount of friction on their peripheries, said guide rollers having a diameter slightly greater than that of the pitch circle of said toothed roller to compensate for slippage between said driven shaft and guide rollers and to equalize the tension in said film.

2. In an apparatus for developing photographic films, a driving mechanism having a frame, a driven shaft carried by said frame, a toothed feed roller for supplying film to said driven shaft, a second toothed roller for removing film from said driven shaft, at least one of said rollers being driven at a speed equal to that of the driven shaft and neither toothed roller being driven at a speed greater than said driven shaft, an idler shaft also carried by said frame and spaced from said driven shaft, said frame having slots in which said idler shaft is movable towards and away from said driven shaft, pinions fastened to the ends of said idler shaft and racks mounted on said frame adjacent said slots, said racks being engaged by said pinions and maintaining said idler shaft parallel to said driven shaft regardless of movement of said idler shaft towards and away from said driven shaft, each of said shafts carrying rollers for guiding the film around said shafts, the guide rollers on said driven shaft being mounted thereon for rotation therewith until there is a certain amount of friction on their peripheries, said guide rollers having a diameter slightly greater than that of the pitch circle of said toothed rollers to compensate for slippage between said driven shaft and guide rollers and to equalize the tension in said film.

3. In an apparatus for developing photographic films, a driving mechanism having a frame, a driven shaft carried by said frame, a toothed roller for driving said film and connected with said driven shaft for rotation at the same angular velocity as that of said shaft, an idler shaft also carried by said frame and spaced from said driven shaft, said idler shaft being movable towards and away from said driven shaft, whereby the tension on the individual loops of a film wound between said shafts is determined largely by the weight of said idler shaft, each of said shafts carrying rollers for guiding the film around said shafts, the guide rollers on said driven shaft being mounted thereon for rotation therewith until there is a certain amount of friction on their peripheries, said guide rollers having a diameter slightly greater than that of the pitch circle of said toothed roller to compensate for slippage between said driven shaft and guide rollers and to equalize the tension in said film.

4. In an apparatus for developing photographic films, a driving mechanism having a frame, a driven shaft carried by said frame, a toothed roller for driving said film and connected with said driven shaft for rotation at the same angular velocity as that of said shaft, an idler shaft also carried by said frame and spaced from said driven shaft, said idler shaft being movable towards and away from said driven shaft, interengaging means on said frame and idler shaft for maintaining said idler shaft parallel to said driven shaft regardless of movement of said idler shaft towards and away from said driven shaft, each of said shafts carrying rollers for guiding the film around said shafts, the guide rollers on said driven shaft being mounted thereon for rotation therewith until there is a certain amount of friction on their peripheries, said guide rollers having a diameter slightly greater than that of the pitch circle of said toothed roller to compensate for slippage between said driven shaft and guide rollers and to equalize the tension in said film.

EMIL FESS.